United States Patent
Howieson et al.

(10) Patent No.: US 10,408,701 B2
(45) Date of Patent: *Sep. 10, 2019

(54) LEAK DETECTION SYSTEM

(71) Applicant: CASCADE TECHNOLOGIES HOLDINGS LIMITED, Stirling (GB)

(72) Inventors: Iain Howieson, Stirling (GB); Paul Miller, Stirling (GB); Stephen Waldron, Stirling (GB)

(73) Assignee: CASCADE TECHNOLOGIES HOLDINGS LIMITED (GB)

( * ) Notice: Subject to any disclaimer, the term of this patent is extended or adjusted under 35 U.S.C. 154(b) by 0 days.

This patent is subject to a terminal disclaimer.

(21) Appl. No.: 15/920,311

(22) Filed: Mar. 13, 2018

(65) Prior Publication Data

US 2018/0202887 A1 Jul. 19, 2018

Related U.S. Application Data

(63) Continuation of application No. 14/916,734, filed as application No. PCT/GB2015/052229 on Jul. 31, 2015, now Pat. No. 9,939,342.

(30) Foreign Application Priority Data

Aug. 1, 2014 (GB) .................................. 1413708.7

(51) Int. Cl.
*G01M 3/00* (2006.01)
*G01M 3/20* (2006.01)
(Continued)

(52) U.S. Cl.
CPC ............ *G01M 3/186* (2013.01); *G01M 3/229* (2013.01); *G01M 3/38* (2013.01)

(58) Field of Classification Search
CPC .......... G01M 3/00; G01M 3/18; G01M 3/186; G01M 3/20; G01M 3/22; G01M 3/229; G01M 3/38
See application file for complete search history.

(56) References Cited

U.S. PATENT DOCUMENTS

| | | | |
|---|---|---|---|
| 2,232,711 A | 2/1941 | Maher | |
| 3,750,458 A | 8/1973 | Messervey et al. | |

(Continued)

FOREIGN PATENT DOCUMENTS

| | | | |
|---|---|---|---|
| CN | 201503340 | 6/2010 | |
| CN | 103884477 | 6/2014 | |

(Continued)

OTHER PUBLICATIONS

International Search Report and Written Opinion for International (PCT) Application No. PCT/GB2015052229 prepared by the European Patent Office, dated Oct. 5, 2015, 9 pages.

(Continued)

*Primary Examiner* — Nguyen Q. Ha
(74) *Attorney, Agent, or Firm* — Sheridan Ross P.C.

(57) ABSTRACT

A leak detection system for detecting leaks in pressurized containers, the system comprising a leak test conveyor for moving each container and an accumulation tunnel through which the leak test conveyer extends, wherein the accumulation tunnel and the leak test conveyer together define at least one enclosed accumulation volume, each enclosed accumulation volume being sized to accommodate only a single container, thereby to allow gas leaking from the single container to accumulate, and a gas sensor for sensing accumulated leaked gas from the single container.

31 Claims, 15 Drawing Sheets

(51) Int. Cl.
*G01M 3/18* (2006.01)
*G01M 3/22* (2006.01)
*G01M 3/38* (2006.01)

(56) References Cited

U.S. PATENT DOCUMENTS

| | | | |
|---|---|---|---|
| 4,105,122 A | 8/1978 | Flood et al. |
| 5,285,678 A | 2/1994 | McDaniel et al. |
| 5,388,466 A | 2/1995 | Teunissen |
| 5,606,114 A | 2/1997 | Palmer |
| 5,668,307 A | 9/1997 | Wade |
| 6,279,384 B1 | 8/2001 | Heikkinen et al. |
| 6,473,169 B1 | 10/2002 | Dawley et al. |
| 8,692,186 B2 | 4/2014 | Lehmann |
| 9,939,342 B2 | 4/2018 | Howieson et al. |
| 2002/0026258 A1 | 2/2002 | Suzuki et al. |
| 2005/0115305 A1 | 6/2005 | Nothhelfer et al. |
| 2014/0115856 A1 | 5/2014 | Lehmann |
| 2015/0083918 A1 | 3/2015 | Emmenegger et al. |
| 2015/0177093 A1 | 6/2015 | Lehmann |

FOREIGN PATENT DOCUMENTS

| | | |
|---|---|---|
| DE | 3307376 | 9/1984 |
| EP | 0619478 | 10/1994 |
| EP | 0744605 | 11/1996 |
| EP | 1324014 | 7/2003 |
| GB | 1350187 | 4/1974 |
| GB | 2376749 | 12/2002 |
| JP | 2008-008626 | 1/2008 |
| JP | 2011-226899 | 11/2011 |
| WO | WO 2011/012730 | 2/2011 |

OTHER PUBLICATIONS

Official Action for U.S. Appl. No. 14/916,734, dated Jun. 29, 2017, 18 pages.

Notice of Allowance for U.S. Appl. No. 14/916,734, dated Nov. 30, 2017, 6 pages.

Search Report for United Kingdom Patent Application No. GB1413708.7, dated Dec. 8, 2014, 6 pages.

INFEED GUIDE AND FINS

SHAPES OF FLIGHTS

EASE OF DEPLOYMENT

1. OPERATOR SENDS A QC SIGNAL VIA THE OPERATOR'S PANEL.
2. QC CAN(S) GETS KICKED OFF.
3. SLIDES DOWN A CHUTE.
4. DROPPED INTO ANOTHER CHUTE, DIRECTING THE CAN(S) TOWARDS THE FRONT OF THE SYSTEM READY TO BE COLLECTED

INTERGRATED QC SAMPLING

LEAK DETECTION SYSTEM

CROSS REFERENCE TO RELATED APPLICATIONS

This application is a continuation of U.S. patent application Ser. No. 14/916,734, which is a national stage application under 35 U.S.C. 371 and claims the benefit of PCT Application No. PCT/GB2015/052229 having an international filing date of Jul. 31, 2015, which designated the United States, which PCT application claimed the benefit of United Kingdom Application No. 1413708.7 filed Aug. 1, 2014, the disclosures of each of which are incorporated herein by reference.

INTRODUCTION

The disclosure relates to a leak detection device for the detection of leaks in pressurised containers, for example pressurised metered dose inhaler (pMDI) aerosol cans.

BACKGROUND OF THE INVENTION

Pressurised metered dose inhaler canisters are filled with a mixture of propellant and active ingredient. Legislation dictates a maximum leak rate of the combined propellant/ingredient, typically measured in mg/day or g/year, for each product. Canisters found to be leaking at a rate greater than this should be eliminated from production batches upon detection. The specific leak rate is subject to the product type/canister size but is of the order of 1 mg/day.

The most common method of determining whether the can is leaking is to weigh the can twice, with a sufficient period of time in between measurements to accurately assess if the mass of propellant lost in the elapsed time corresponds to a leak rate above the specification. In practice, the accuracy of a typical online check weigh device is <0.05 g and the tolerance is set to reject cans falling more than +/−0.5 g outside of the target fill weight. In the four week dwell period between tests, a typical check weigh device could expect to catch no more than 50% of cans leaking at a rate of 15 mg/day, which is more than 10 times higher than the legislative requirements. In principle, cans leaking as much as 30 mg/day are able to enter the consumer market.

To mitigate the possibility of a systemic production issue generating leaks between 1-30 mg/day that might otherwise escape detection, a sample of cans is extracted from the production line for laboratory analysis with more precise instrumentation. In this instance, the period between weights is typically three days. This type of analysis is capable of detecting leaks at specification. However, the testing is only carried out on a small fraction of overall production and the cans are not returned to production.

Other methods of online leak detection lack either the speed or sensitivity to achieve the specification requirements. These other technologies may include optical absorption techniques, flame ionisation detection, photo-ionisation detection, pressure loss/decay, $O_2$ sensors or other oxygen displacement techniques, conductivity, submersion, acoustic or other water bath based systems. In the event of a production or component fault resulting in leaking canisters, the earliest that small leaks are likely to be detected is three days after production and the longest period may be up to one month. At a typical rate of 200,000-300,000 canisters per day, this represents a sizeable volume of unfit goods that may accumulate in the intervening period before a leak or process issue is identified.

SUMMARY OF THE INVENTION

According to the present invention, there is provided a leak detection system for detecting leaks in pressurised containers, the system comprising a leak test conveyor for moving each container and an accumulation tunnel through which the leak test conveyer extends, wherein the accumulation tunnel and the leak test conveyer together define at least one enclosed accumulation volume, each enclosed accumulation volume being sized to accommodate only a single container, thereby to allow gas leaking from the single container to accumulate, and a gas sensor for sensing accumulated leaked gas from the single container.

By allowing gas from each container individually to accumulate in a substantially enclosed volume, a high level of detection sensitivity can be achieved.

Preferably, the accumulation tunnel and the leak test conveyer together define multiple discrete enclosed accumulation volumes. The accumulation tunnel may be sized to accommodate at least two, and preferably three or more containers at any one time.

The accumulation volume is movable with the leak test conveyer for a time sufficient to allow leaked gas to accumulate.

The leak test conveyer may comprise multiple pockets, each pocket defining at least in part the accumulation volume. Each pocket is sized to hold a single container. A leading edge of each pocket may be tapered.

The leak test conveyer may comprise a conveyer belt. The leak test conveyer belt may be vertically oriented. The leak test conveyor may comprise an endless loop.

A reject mechanism may be provided for rejecting leaking cans. The reject mechanism may be contactless, for example the reject mechanism may comprise means for generating a jet of air for pushing cans identified as leaking from the leak test conveyer.

The sensor may comprise an optical sensor. The optical sensor preferably includes a laser, for example a semiconductor diode laser, optionally a quantum cascade laser, for example a pulsed, chirped, quantum cascade laser. The laser may operate at a wavelength selected to match an optical absorption band of a target gas, for example a target propellant. Ideally, the laser wavelength selected is free from cross interference.

The sensor may comprise two or more detectors. The two or more detectors may be multiplexed. The detectors may be used in sequence or series. Ideally, only one detector is active at any one time. This means that each detector is allowed a rest or recovery period. The sequence or series may be triggered when cans move through the accumulation tunnel.

The system may be adapted to divert cans from a production line conveyor onto the leak detection conveyor. The leak detection conveyor may traverse the production line conveyer. The leak detection conveyor may traverse the production line conveyor substantially perpendicularly.

According to another aspect of the invention, there is provided a leak detection system for detecting leaks in pressurised containers, the system comprising a leak test conveyor for diverting containers from a production line conveyer into a leak detection test circuit, the leak test conveyor comprising a conveyer that has a plurality of pockets, each pocket sized to receive a single container and a sensor for sensing gas leaked from the containers.

The leak test conveyer may be arranged to move the containers into a substantially enclosed accumulation volume sized to accommodate only a single container, thereby to allow gas leaking from the single container to accumulate, wherein the accumulation volume is defined at least in part by a single pocket.

The accumulation volume may be movable with the leak test conveyor for a time sufficient to allow leaked gas to accumulate. The accumulation volume may be defined at least in part by the leak test conveyer.

The leak detection system may include an accumulation tunnel through which the leak test conveyer moves, wherein the accumulation tunnel and the leak test conveyer together define the enclosed accumulation volume. The accumulation tunnel may be sized to accommodate at least two, and preferably three or more containers at any one time.

Where the containers are vertically positioned on the production line conveyor, the leak test conveyor belt may be vertically oriented. The leak test conveyor may comprise an endless loop.

A reject mechanism may be provided for rejecting leaking cans. The reject mechanism may be contactless, for example the reject mechanism may comprise means for generating a jet of air for pushing cans identified as leaking from the leak test conveyor.

The sensor may comprise an optical sensor. The optical sensor preferably includes a laser, for example a semiconductor diode laser, optionally a quantum cascade laser, for example a pulsed, chirped, quantum cascade laser. The laser may operate at a wavelength selected to match an optical absorption band of a target gas, for example a target propellant. Ideally, the laser wavelength selected is free from cross interference.

The sensor may comprise two or more detectors. The two or more detectors may be multiplexed. The detectors may be used in sequence or series. Ideally, only one detector is active at any one time. This means that each detector is allowed a rest or recovery period. The sequence or series may be triggered when cans move through the accumulation tunnel.

The leak detection conveyer may traverse the production line conveyor. The leak detection conveyer may traverse the production line conveyor substantially perpendicularly.

According to another aspect of the invention, there is provided a conveyor for use in a leak detection system according to any of the preceding claims, the conveyor comprising a conveyor belt that is to be vertically oriented in use, wherein the conveyor belt has a plurality of pockets, each pocket sized to receive a single vertically oriented container. The conveyor may be an endless loop conveyor.

According to yet another aspect of the invention there is provided a leak detection system comprising multiple detectors, a sample cell and a selector for selectively coupling one of the detectors to the sample cell. Preferably the selector is operable to couple each of the detectors to the sample cell in turn, so that each detector is operable individually to detect a sample in the sample cell when it is coupled to that cell.

The leak detection system with multiple detectors may be a leak detection system in accordance with the other aspects of the invention. In particular, the leak detection system may be configured to detect leaks in a pressurised container production system (for example an aerosol can production system).

The containers may be on a conveyor. The leak detection system may be configured to selectively couple one of the multiple detectors to a sample cell in response to detection of a container on the conveyor in the vicinity of the sample cell.

Means for selecting one of the detectors, for example a switch, may be provided for selectively coupling different detectors to the sample cell in response to detection of consecutive containers. For example, the selecting means may be operable to selectively connect a first detector to the sample cell in response to detection of a first container, and a second detector to the sample cell in response to detection of a second container, wherein the first and second containers are consecutively located on the conveyor. Preferably, the switch is configured to selectively couple the first and second detectors to the sample cell alternately, so that containers located on the conveyor are alternately sampled by the first or second detector.

Selecting means may be configured to selectively couple one of the detectors to the sample cell for a predetermined time. The predetermined time may be selected to ensure that the sample concentration is at a maximum when the detector is detecting.

BRIEF DESCRIPTION OF THE DRAWINGS

Various aspects of the invention will now be described by way of example only and with reference to the accompanying drawings, of which:

FIGS. 20 to 24 are schematic representations of another dual detector arrangement.

DETAILED DESCRIPTION OF THE DRAWINGS

Figure 1:
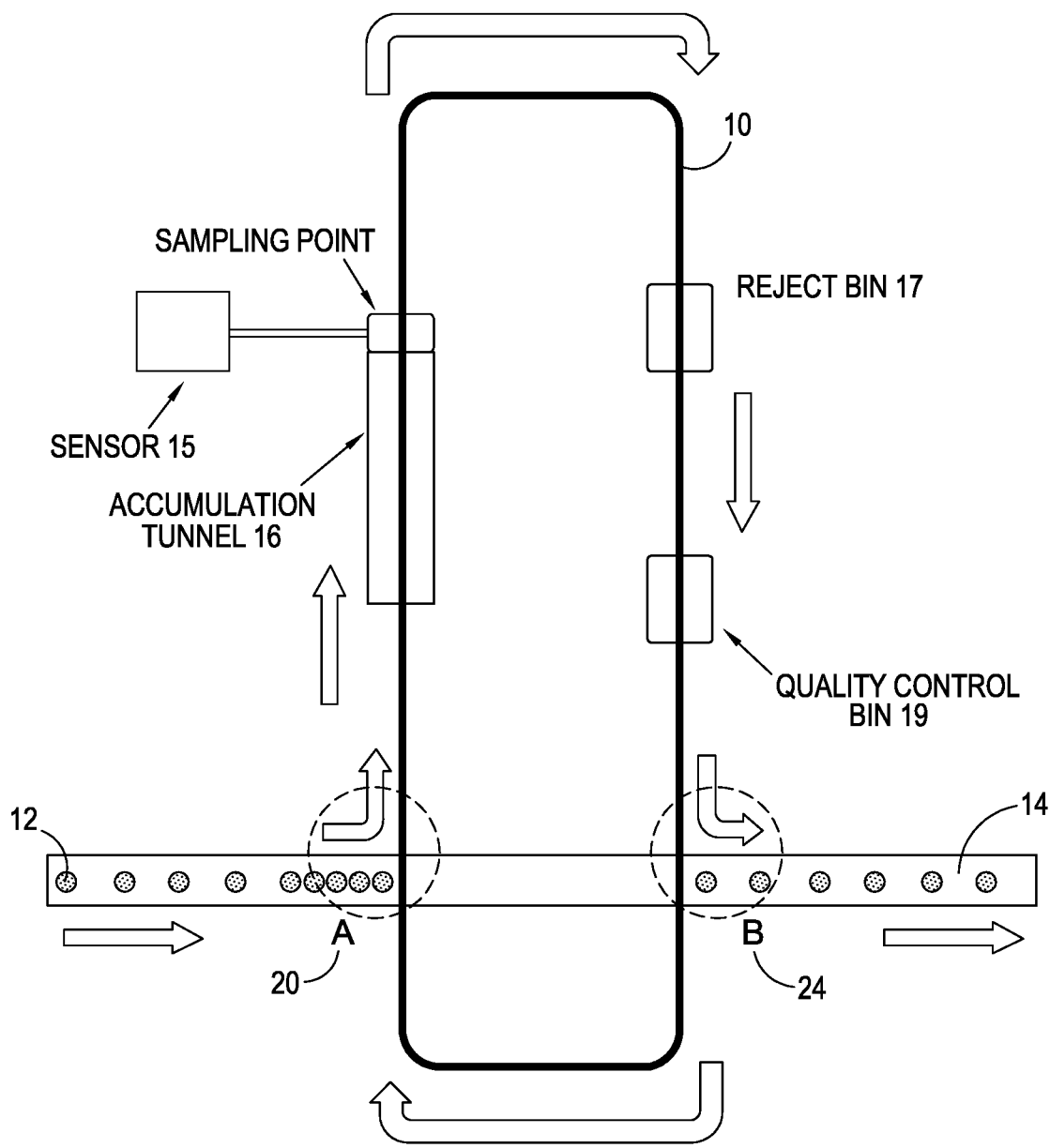
FIG. 1 is a schematic view of a leak detection system.

The present invention relates to a leak detection system for use in a pressurised container production system in which the pressurised containers move along a horizontal conveyer belt. The leak detection system has a leak test conveyer belt 10 for moving the cans 12 from the production conveyer belt 14 into a test circuit, an accumulation tunnel 16 that the containers move into for accumulating leaked gas in proximity to a leaking container, and a sensor 15 to detect the presence of propellant leaked into the sampled air. A reject mechanism is provided to remove leaking cans from the production line in the event that the sensor 15 detects a leak.

FIG. 1 is a schematic view of a production line conveyer belt 14 carrying a line of upright, vertically oriented cans 12 and a leak detection test circuit into which cans on the production line are diverted. The leak detection test circuit has an endless vertically oriented conveyor belt 10 that moves in an endless loop. The leak detection test circuit extends generally perpendicularly across the production line conveyor belt 14.

On an external surface of the vertical conveyer belt 10 are multiple pockets 18, each sized to receive a single vertically oriented can 12, so the cans 12 can be captured from the production line 14 at a can infeed 20 and guided in the direction of movement of the vertical conveyor belt 10. This is seen in more detail in FIG. 2. Below the vertical test conveyer belt 10 is a support 22 for supporting the cans 12 on the vertical conveyer belt 10. This follows the same general path as the vertical conveyer belt 10, but has gaps at two positions to accommodate the production line conveyer belt 14.

Along the length of the vertically oriented conveyor belt 10 is an accumulation tunnel or channel 16, through which the belt 10 passes as it moves round its endless loop. The accumulation tunnel 16 has a substantially L-shaped cross section and extends up from the support 22 and over the top of the vertical test conveyer belt 10, so that the tunnel 16, the vertically oriented conveyor belt 10 and the support 22 together define an enclosed, tunnel volume. Each pocket 18 when in the tunnel 16 defines an individual enclosed volume for a single can 12. Each can 12 on the test circuit conveyer belt 10 is guided through the accumulation tunnel 16. During transit through the accumulation tunnel 16, gas leaking from a canister is allowed to accumulate in the small pocket of air surrounding the can. At the exit of the accumulation tunnel 16 is a sampling point. Connected to the sampling point is a gas sensor 15. Gas is extracted from the sampling point and delivered to the gas sensor 15. The gas sensor 15 is operable to determine whether the gas comprises leaked gas.

Based on the output of the gas sensor 15 a decision is made whether to reject the can from the leak detection system or to return it to the production line 14. Downstream from the accumulation tunnel 16 on the test circuit is a reject bin 17 and a quality control bin 19. An air controlled can ejection system (not shown) is provided at each of the reject and quality control bins 17 and 19 respectively. Canisters can be removed from the vertical conveyer belt 14 by directing a blast of air at the back of the pocket in which the selected canister is located. The reject bin is positioned to catch a can that has been rejected from the leak detection test circuit. The quality control bin is positioned to catch a can that has been targeted for quality control sampling. Cans 12 that are not rejected or selected for quality control are moved back onto the production line at a can outfeed 24.

Figure 2A:
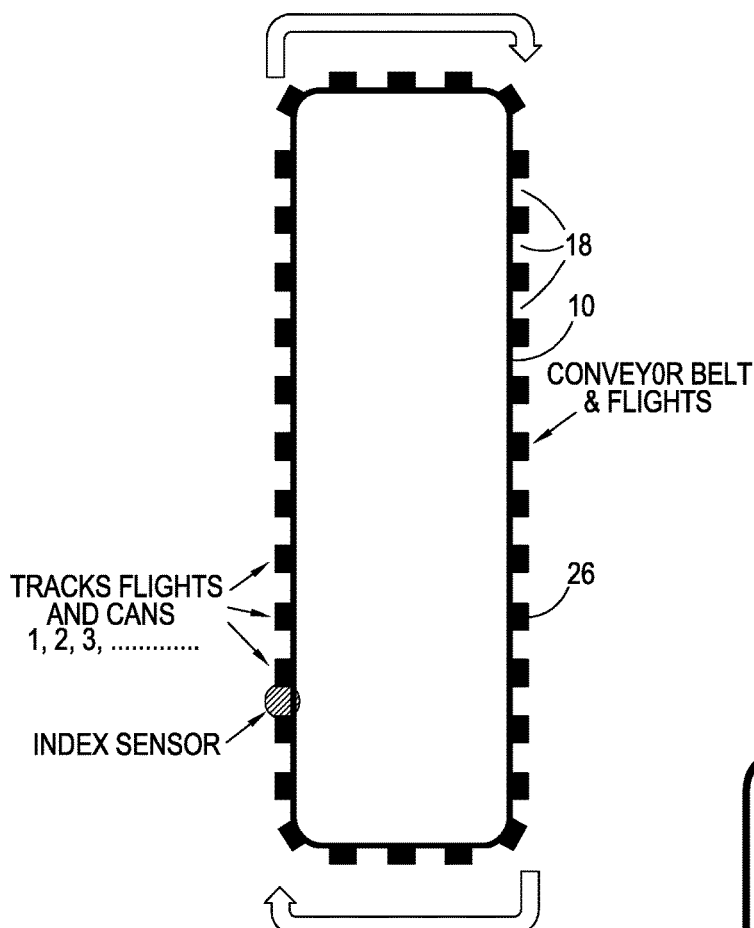
FIG. 2(a) is a schematic view of indexing of pockets on a vertical test conveyor.
Figure 2B:
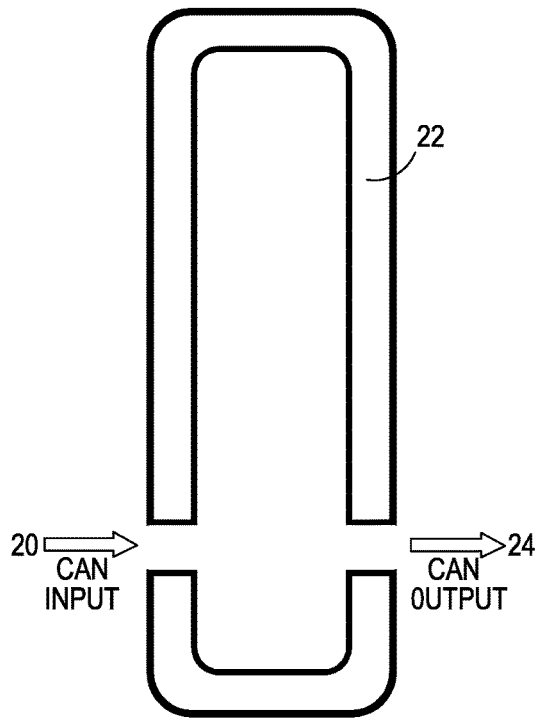
FIG. 2(b) is a schematic view of a support for supporting cans on the vertical test conveyor of FIG. 2(a)

FIG. 2(*a*) shows the vertically oriented conveyor 10 in more detail. The pockets 18 are defined by blocks 26 that act to secure and separate the cans for the duration of travel through the leak test system. Each pocket 18 is tracked through means of an index sensor that detects the passage of a block 26, and so a can that is in a pocket 18 defined by that block 26. Each pocket 18 has a width that corresponds to the diameter of the containers, so that the containers are securely held within the pocket 18. Adjacent pockets 18 are typically separated by a distance of at least the diameter of a container, so that the centre to centre separation of each pocket 18 is at least two diameters of a container.

FIG. 2(*b*) shows the support 22 for supporting the cans on the vertical conveyer belt 10. In use, cans moving on the vertical conveyer belt slide over the support 22. The support 22 follows the same general path as the vertical conveyer belt. The support is positioned below the vertical conveyor belt. The support 22 has gaps at various positions. The support has a first pair of gaps to accommodate the can production line infeed 20 and outfeed 24. A lip extends round an external side of the support, in which is formed another two gaps (not shown). Traversing the path of the support 22 from the can input, in the direction of movement of the vertical conveyer 10, and downstream from the accumulation tunnel 16, the first gap encountered in the support lip is the reject gap. The reject gap of the support 22 allows a can to be removed from the test circuit without disruption to existing production processes. Below the reject gap is the reject bin 17 for collecting rejected cans. The second gap in the support lip is the quality control gap. The quality control gap allows a targeted can to be removed for quality control purposes without disruption to existing production processes. Below the quality control gap is the quality control bin 19 for collecting cans removed for quality control purposes.

Figure 3:
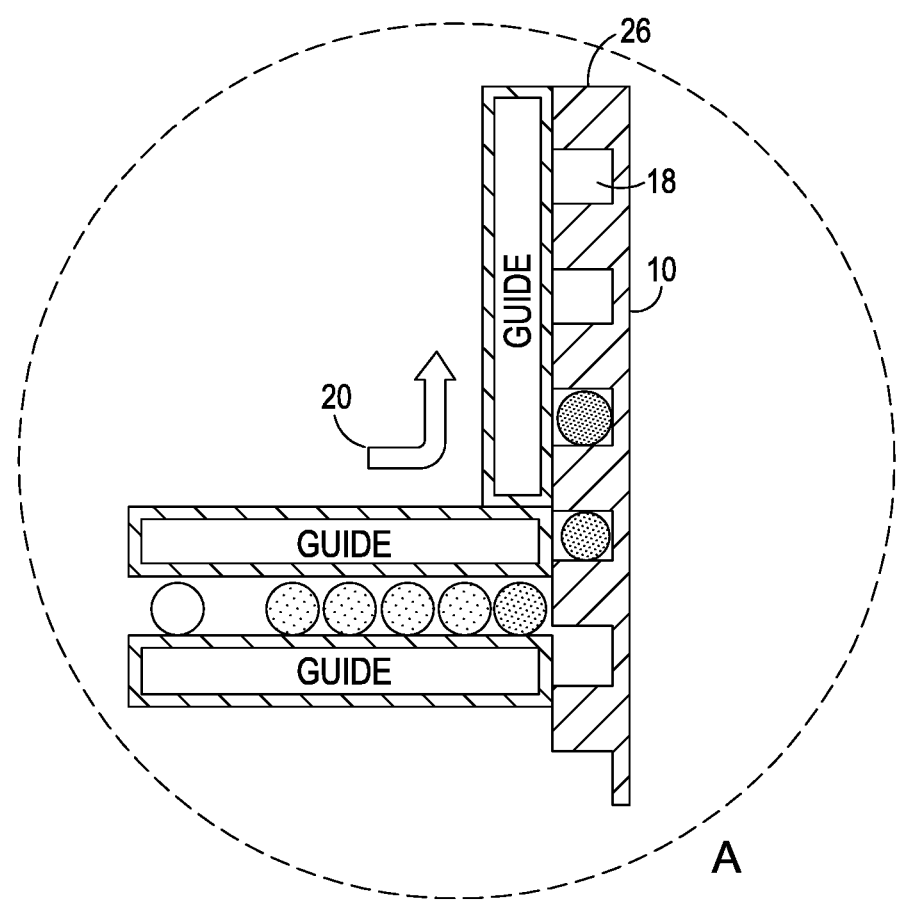
FIG. 3 is a schematic view of a can infeed of the leak detection system of FIG. 1.

FIG. 3 shows the container transfer from the production line conveyer belt 12 to the vertical test conveyer belt 10 at the can infeed point A. Containers on the production line 12 are queued in a single line and push up against the vertical conveyer 10. Both conveyer belts are moving. As the vertical conveyer 10 moves across the production line conveyer 14, the container 12 at the front of the queue initially pushes against one of the vertical conveyer blocks 26. As the vertical conveyer moves further round its cycle, the block 26 moves past the front container, so that an open pocket is aligned with the container. Continued movement of the production line conveyer 14 imparts a directional force on the front container, which pushes the container into the pocket 18. Continued movement of the vertical conveyer belt 10 moves the container in the pocket 18 into the test cycle. Once this block 26 has transited the can infeed 20, the next can is able to enter the system. The next container 12 in the queue then becomes the front container and the process is repeated, so that every container 12 is sequentially diverted into the leak detection test circuit.

Figure 4:
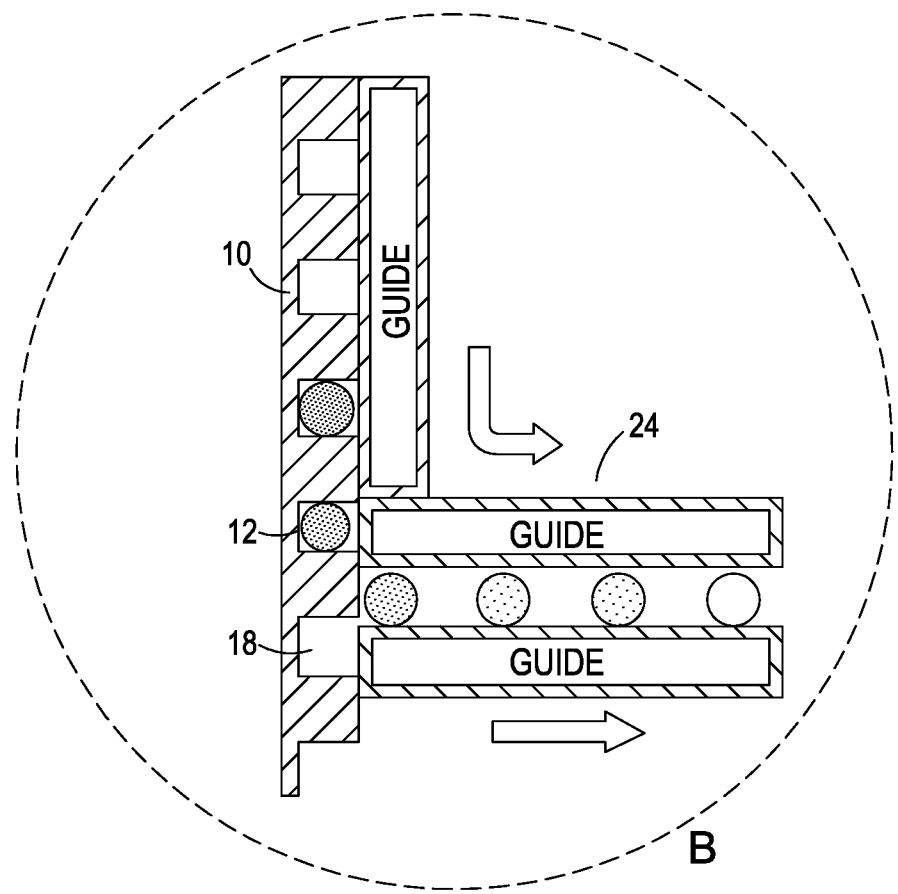
FIG. 4 is a schematic view of a can outfeed of the leak detection system of FIG. 1.

FIG. 4 shows the container transfer from the vertical test conveyer belt 10 to production line conveyer belt 14 at the can outfeed point 24. Both conveyer belts 10 and 14 are moving. As the vertical conveyer 10 moves across the production line conveyer 14, a container in the pocket over the production line conveyer belt 14 drops out of its pocket onto the production line conveyer belt. Continued movement of and frictional engagement with the production line conveyer causes 14 the container 14 to be pushed away from the vertical conveyer belt and back into the main production line 14. The next container in the vertical belt 10 then moves over the production line conveyer 14 and the process is repeated, so that every container 12 is sequentially moved from the leak detection test circuit back into the main production line 14.

Figure 5:
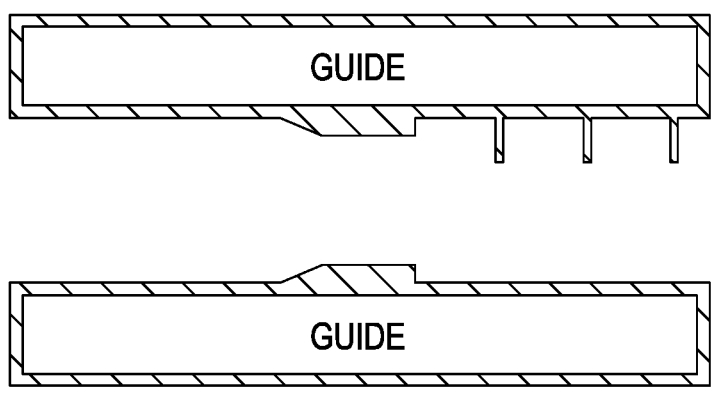
FIG. 5 is a schematic view of guides and fins of the infeed of FIG. 3.

In order to ensure smooth transfer of cans from the production line onto the vertical conveyer belt 10, some form of stabilisation may be need at the infeed 20 to prevent movement of the cans. FIG. 5 shows an example of a can infeed on which stabilisation fins are provided. The fins act as vibration dampers to minimise bouncing of the cans that are queued up each time the leading can is picked up by a pocket. This helps ensure that the cans are optimally positioned for transfer into one of the pockets on the vertical conveyer belt 10.

Figure 6:
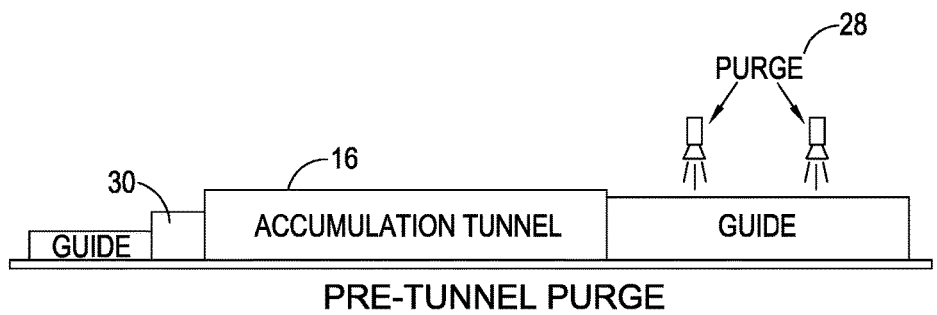
FIG. 6 is a vertical cross-section of the can infeed of FIG. 3, a purge and an accumulation tunnel.

FIG. 6 shows a side view of a region of the leak detection test circuit in the vicinity of the accumulation tunnel 16. On the test circuit before the accumulation tunnel 16 in the direction of movement of the vertical conveyer 10 a purge arrangement 28 is provided. Cans are purged of residual contamination from the factory environment before entering the accumulation tunnel in order to provide a clean measurement. Typically, this is done by blasting the cans with pressurised air. On the test circuit immediately after and in-line with the accumulation tunnel 16 is a sampling head 30. This open on one side to allow gas accumulated in a pocket to move into the sampling head 30. Connected to this is a tube that is connected to the gas sensor 15. A pump is provided to pump gas from the sampling chamber to the gas sensor 15. The gas sensor 15 is operable to detect gas, typically propellant that may be leaking from the containers.

Figure 7:
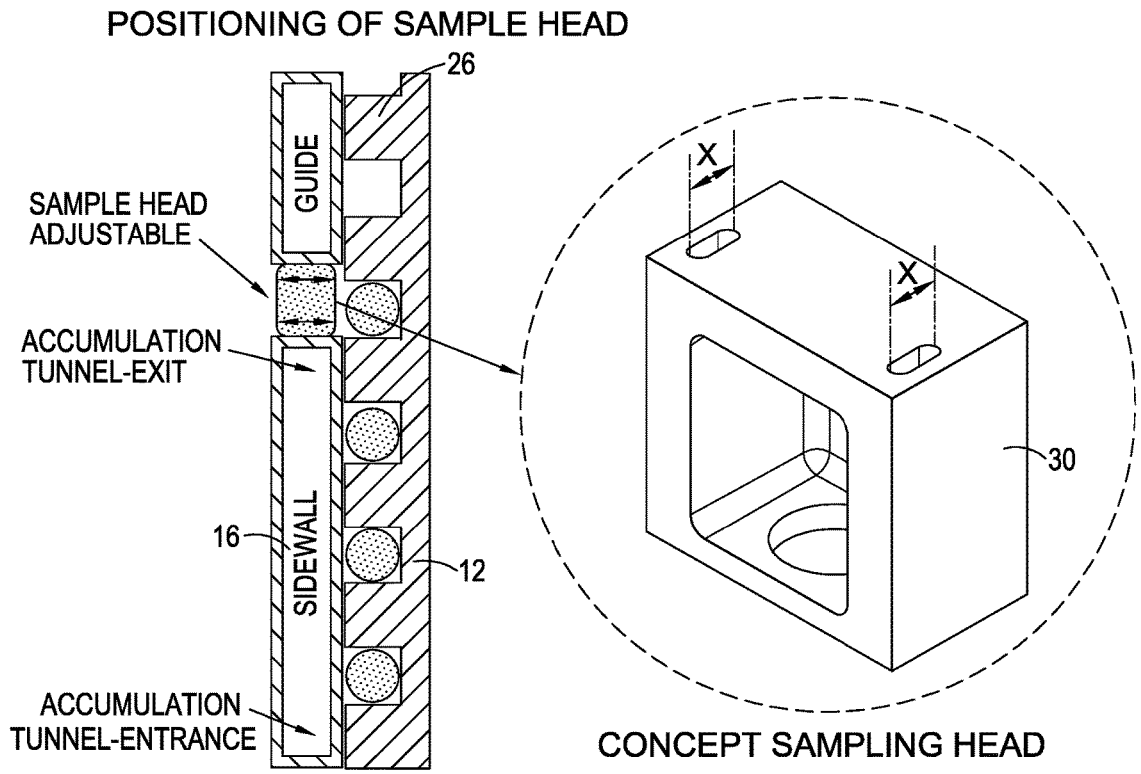
FIG. 7 illustrates the positioning of a sample head on the leak detection system of FIG. 1.
Figure 8:
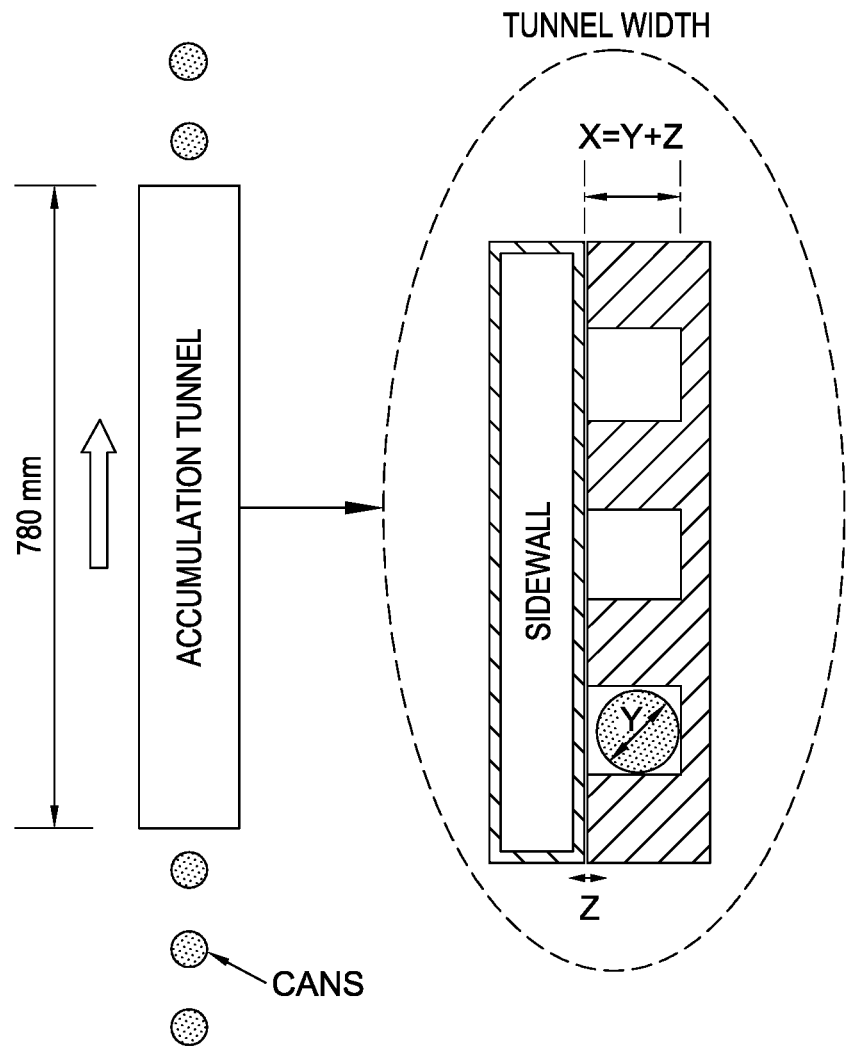
FIG. 8 is a plan of the accumulation tunnel of the leak detection system of FIG. 1.

FIG. 7 and FIG. 8 show the accumulation tunnel 16 and sampling head 30 in more detail. The accumulation tunnel 16 is sized to fit snuggly round the vertical conveyor belt 10, so that there are minimal gaps between the ends of the pocket blocks and the tunnel wall. This means that as each pocket 18 moves through the accumulation tunnel, the tunnel, the conveyer belt support and each pocket cooperate to define a discrete sample accumulation volume. In the example shown in FIGS. 7 and 8, the accumulation tunnel 16 defines one sidewall and an upper ceiling of each discrete sample accumulation volume, the support 22 defines a floor, and each pocket 18 defines three sidewalls, so that the sample accumulation volume is entirely enclosed by six walls. The arrangement is such that there is substantially no leakage between adjacent pockets. In practice, separation of the tunnel side walls must closely match the depth of the blocks that form the pockets 18. Ideally, clearance of less than 0.5 mm between the ends of the pocket blocks and the walls of the accumulation tunnel 16 is required to achieve effective accumulation of propellant in the pocket. The accumulation tunnel 16 may be sized to accommodate at least two, preferably three or more containers at any one time.

During transit through the accumulation tunnel 16, gas leaking from a can 12 is allowed to accumulate in the small pocket of air surrounding the can. This enhances the concentration of propellant that is present and allows a very high sensitivity measurement to be made. For example, by containing the air around the can for a period of a few seconds, sufficient propellant can be accumulated to allow for detection of leaks as low as 0.5 mg/day at a rate of up to 180 canisters per minute. On exiting the accumulation tunnel 16 the air around the can is extracted at the sampling head 30 and delivered to the gas sensor 15. Because each pocket 18 defines a discrete sampling volume each container 12 can be individually tested for leaks as and when it moves into alignment with the sampling chamber. Positioning of the sample head 30 at a suitable distance from the can pocket allows for full extraction of gas in the pocket 18, while avoiding obstructions or blockages in the sample flow. The response of the system is proportional to the amount of propellant in the volume.

In the presence of a detected leak, a reject signal is generated. This signal is correlated to the correct can based on time of flight calculations. The time of flight calculations take into account the speed at which the leak test conveyer 10 is moving and the position of the reject gap and bin relative to the sample head 30. The leaking can is then rejected using a jet of air that is fired from above the vertical conveyer 10 and aimed at the back of the pocket 18 in which the rejected leaking can is positioned. This is done when the time of flight calculations indicate that the leaking can has moved into line with the reject gap. In this way, leaking cans can be removed from the leak test circuit while the leak test conveyer is moving and without disruption to the production line.

Figure 9:
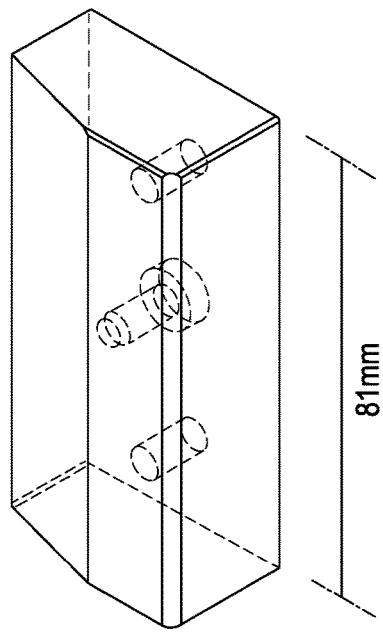
FIG. 9 is a perspective view of a block that is fitted on the vertical test conveyor of FIG. 2(a)

The pockets 18 of the vertical conveyer belt 10 shown in FIG. 2 have a generally rectangular cross section. To provide a smooth pickup of the cans, a taper can be provided on the leading edge of the block, as shown in FIG. 9.

Figure 10:
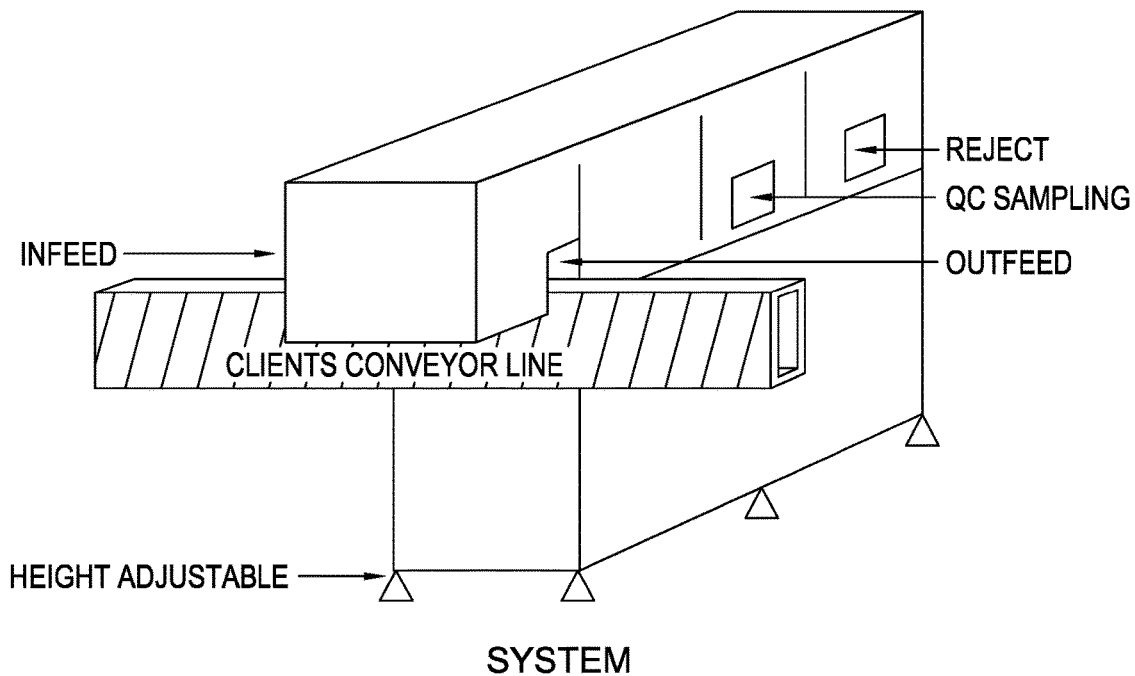
FIG. 10 is perspective view of the leak detection system of FIG. 1.
Figure 11:
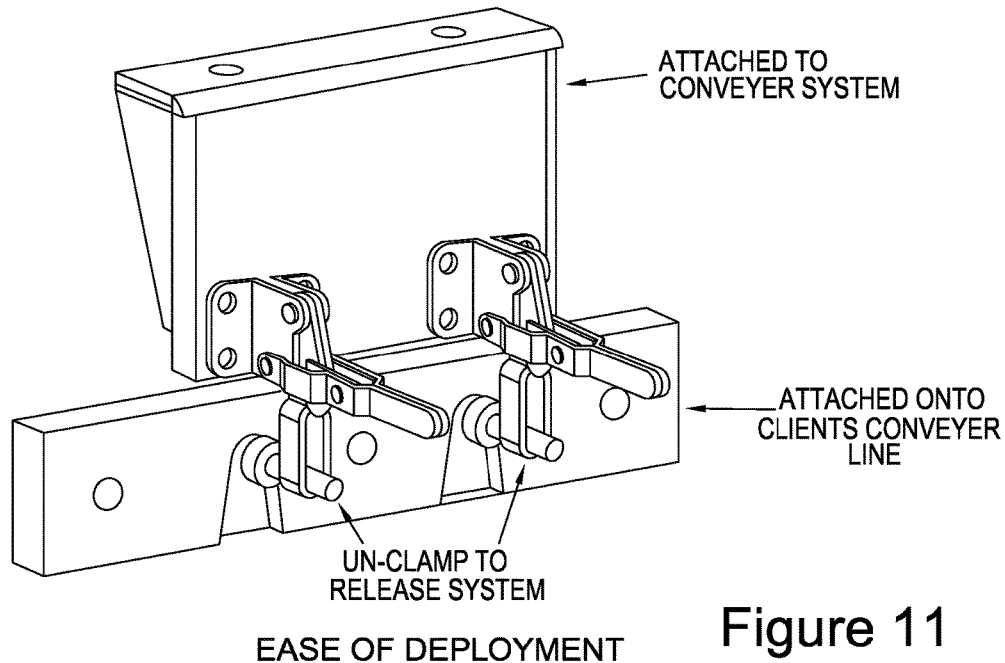
FIG. 11 is perspective view of a quick release clamp attached to vertical conveyor of FIG. 2(a)

FIG. 10 shows a schematic perspective of the leak detector fitted to an existing pressurised canister production line. The design of the device allows for a narrow form factor that minimises production line occupancy. This allows for a high degree of flexibility for the installation of the device in existing production lines where space may be at a premium. The leak detector is coupled to the production line using a quick release clamp, as shown in FIG. 11. This allows for easy installation and removal.

Figure 12:
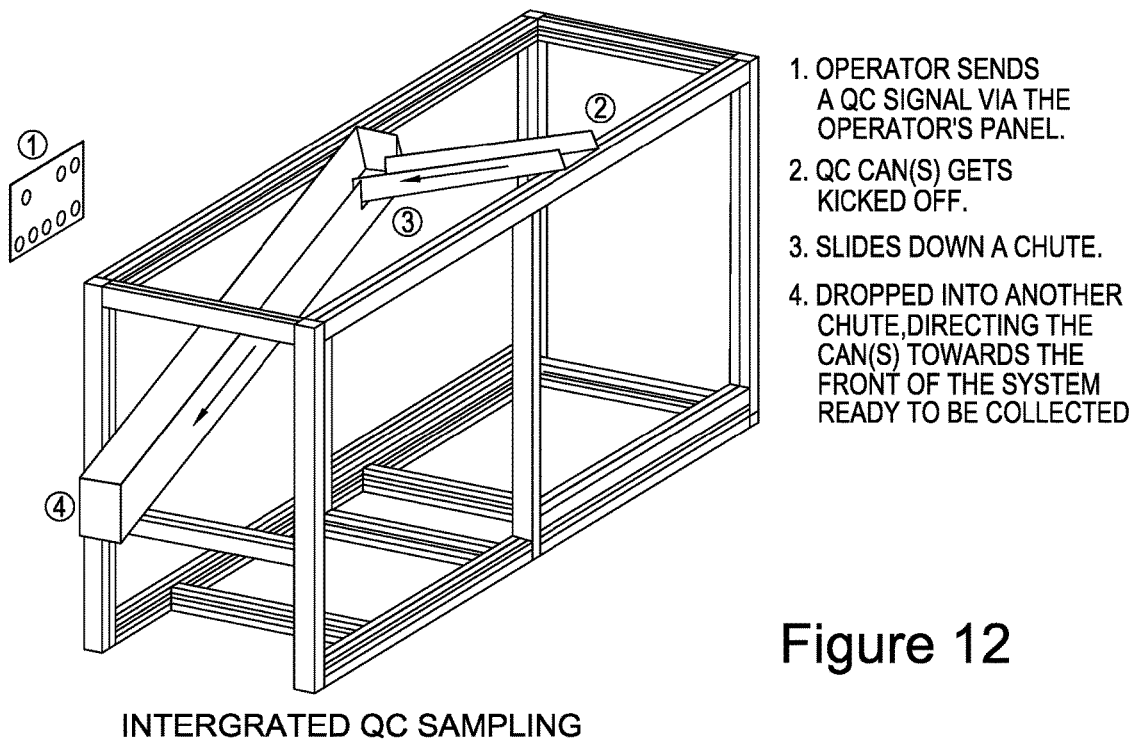
FIG. 12 is perspective view of an integrated quality control sampling point of the leak detection system of FIG. 1.

FIG. 12 shows an example of a quality control sampling point. This has a chute that extends from the quality control gap in the lip of the support 22 and diverts selected cans 12 into the quality control bin 19. A can entering the device infeed 20 may be targeted for removal at the quality control point. On reaching the quality control sampling point, the can is rejected. At this stage the can has already been checked for leaks. This allows external verification to be carried out on cans that have been passed by the leak detector as fit.

Any suitable gas sensor could be used. In a preferred embodiment, detection of the leak is carried out by laser diode optical absorption spectroscopy in the mid infrared. A laser wavelength is selected to match an optical absorption band of the targeted propellant that is free from cross interference. Detection is controlled by use of a recipe to set the sensitivity threshold for rejection of leaking cans. This allows for the operator to easily change the device sensitivity to match the production requirements. In a preferred example, a pulsed, chirped quantum cascade gas sensor is used. By chirping a laser over this wavelength the presence of propellant may be inferred by observation of absorption of the laser light.

Figure 13:
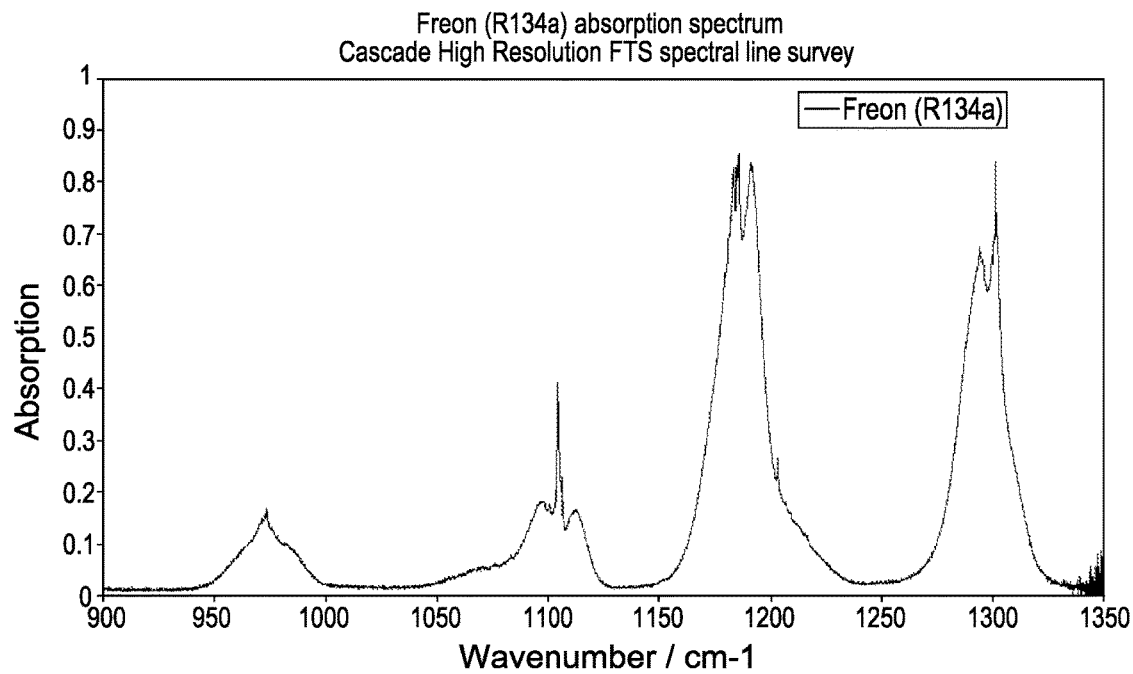
FIG. 13 is a plot showing a mid-infrared absorption spectrum for a targeted propellant using a laser.
Figure 14:
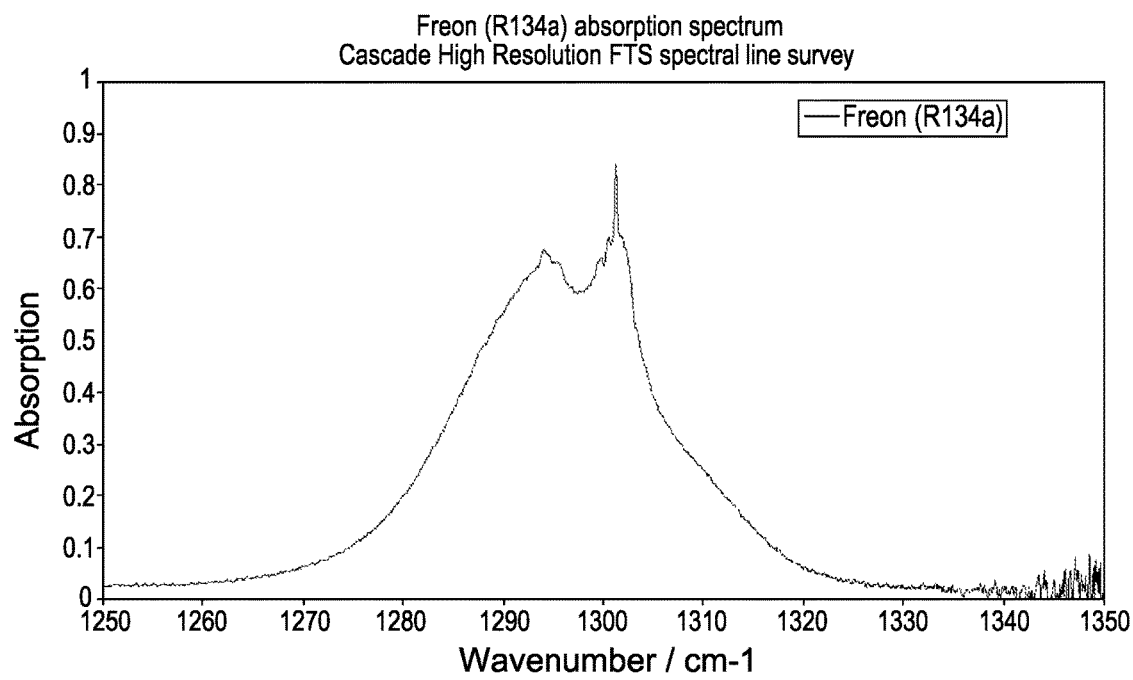
FIG. 14 is an expanded view of the plot of FIG. 13.
Figure 15:
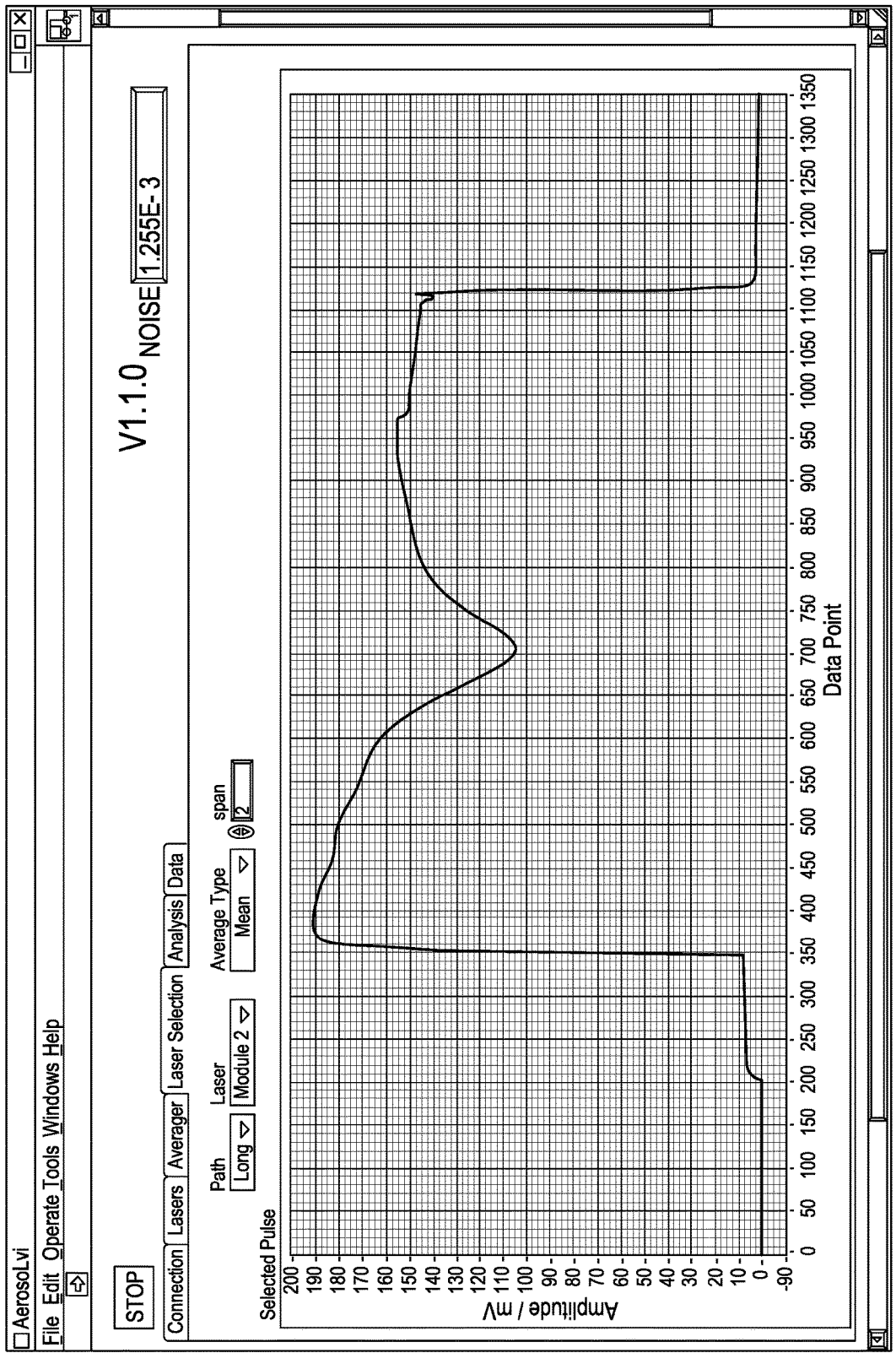
FIG. 15 is a plot resulting from chirping a pulse of the laser.

The mid infrared absorption spectrum for the most commonly used pMDI propellant R134a is shown in FIG. 13. An optimum detection wavelength of 1302 $cm^{-1}$ has been selected for the strong optical absorption properties of R134a at this wavelength and for freedom from cross interference from molecules such as $CO_2$ or $H_2O$ which are abundant in the atmosphere. This is shown in more details in FIG. 14. The wavelength chirp of the laser is configured to sweep over the peak absorption feature at 1302 $cm^{-1}$. This is observable in the laser pulse shown in FIG. 15. The selectivity is achieved by controlling the temperature, width and repetition rate of the laser pulse.

Figure 16:
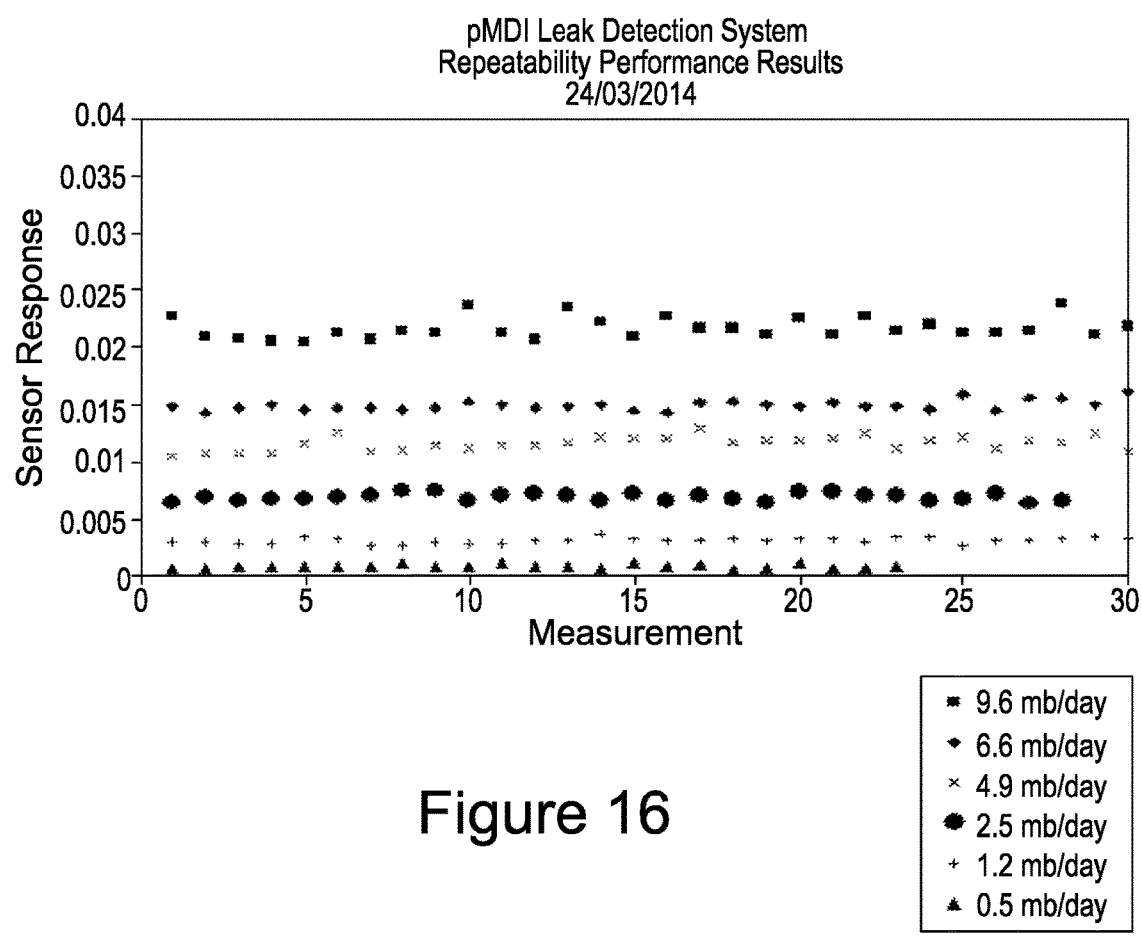
FIG. 16 is a plot for configuration of the accumulation tunnel of FIG. 1 and spacing blocks of FIG. 2(a)

The configuration of the accumulation tunnel and spacing blocks allow for a high degree of repeatability in the amount of propellant accumulated in the pocket. By extracting the air from the pocket in a consistent manner through the use of the sampling head, a high degree of repeatability is maintained. This is shown for leak rates between 0.5 and 10 mg/day in FIG. 16. The repeatability allows for a high degree of specificity in pass/fail rejection criteria.

Figure 17:
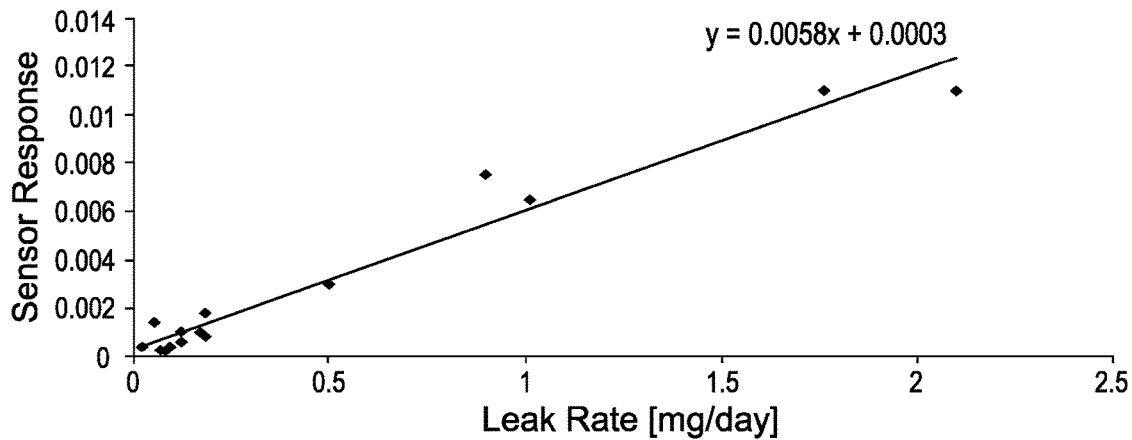
FIG. 17 is a plot of the proportionality of the amount of light absorbed by the propellant of FIG. 13 to an amount of the propellant in a sample.
Figure 18:
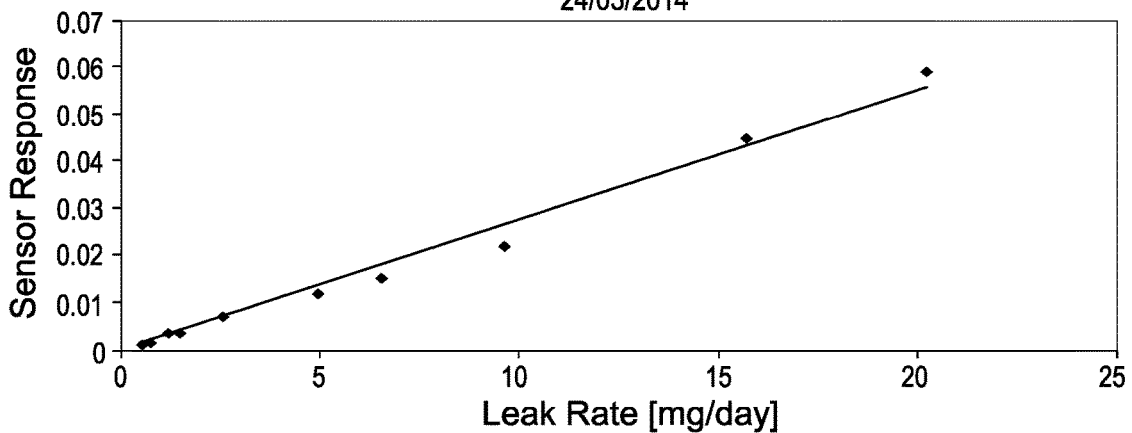
FIG. 18 is another plot of the proportionality of the amount of light absorbed by the propellant of FIG. 13 to an amount of propellant in a sample.

At low concentrations of propellant, the amount of light absorbed by the propellant is approximately proportional to the amount of propellant in the sample. In addition, the amount of propellant in the sample is proportional to the magnitude of the leak. By virtue of this proportionality, the magnitude of the leak rate can be calculated based on the amount of light absorbed by the sample. This proportionality of response is shown in FIG. 17 and FIG. 18. In each case, the leak rate of the test samples is confirmed by weight loss measurements carried out over a period of days. Provided that the time that the measurement was taken is recorded and that the measurement of the can weight is accurate, then a leak rate can be quantified in terms of a mass/time ratio.

The speed of the leak detection system of the invention can be scaled by multiplexing a number of detectors. By virtue of a switching mechanism, synchronised to the passage of cans through the system, a single can is able to be analysed, undisturbed by testing of the cans before and after it. Functional implementations of systems employing multiple detectors are shown in FIGS. 19 to 24.

Figure 19:
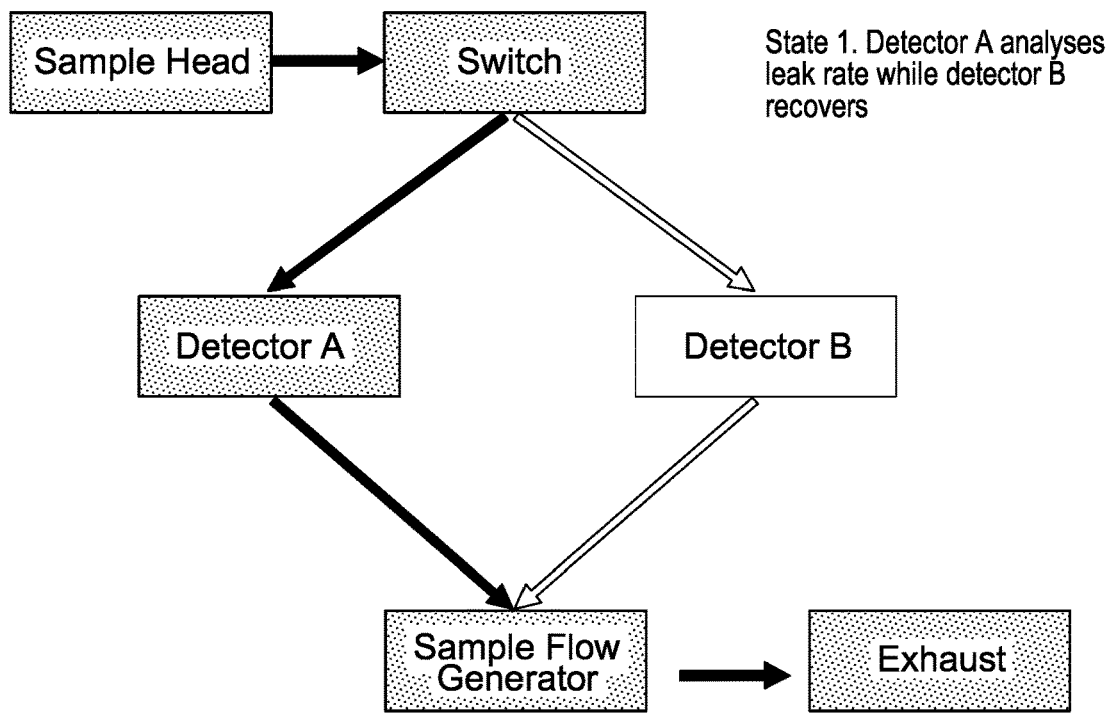
FIGS. 19 and 20 are schematic representations of a first dual detector arrangement.
Figure 20:
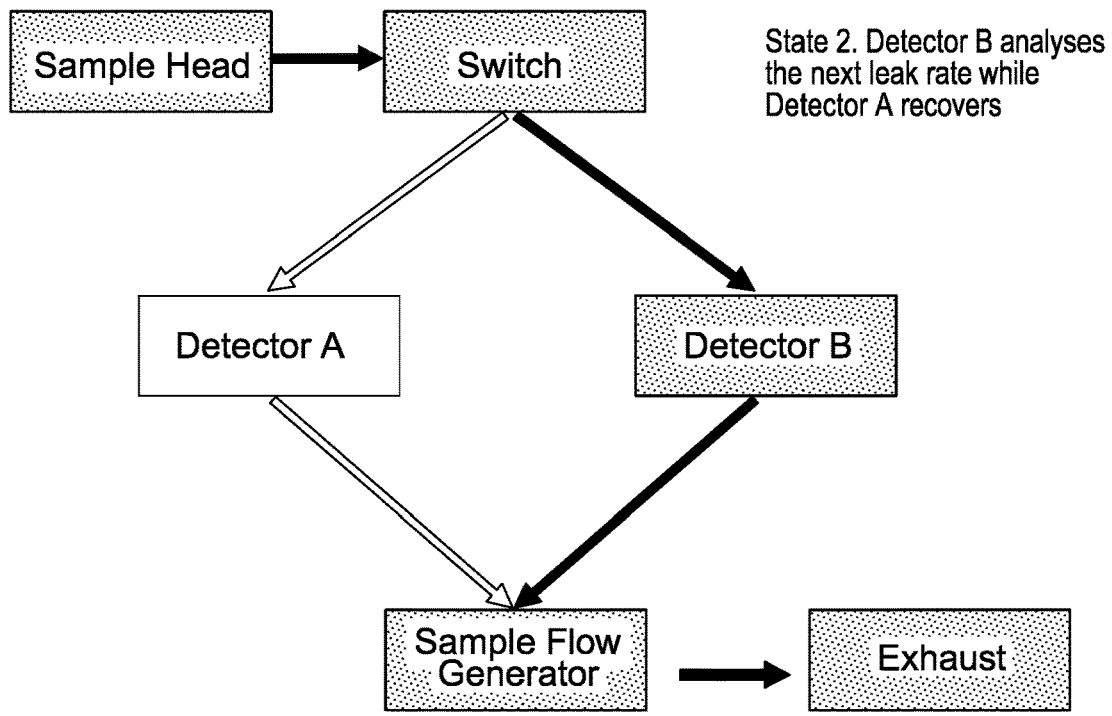

FIGS. 19 and 20 show a dual cell arrangement. In this case, the sample head has a switch that can switch between two detectors, detector A and detector B. The switch is configured so that detector A samples a first can and is then switched off when the next can is detected. Detector B is switched on and used to sample the next can and then switched off when the following can is detected. The process is repeated so that each consecutive can is sampled by detector A or detector B (i.e. each detector samples alternate cans), and only one of detector A or detector B is active at any one time. On the basis that the maximum production rate is governed by "test frequency"=[1/(response time+recovery time)] of the detector, this implementation allows the test rate to be governed solely by the response time of the detector only, because the recovery occurs while the next detector is performing the measurement. The switching mechanism may synchronised by using a sensor, for example an inductive sensor, to detect the presence of cans. Detection of a can causes the switch to change position to cause the test sample to flow to a fresh cell.

Figure 21:
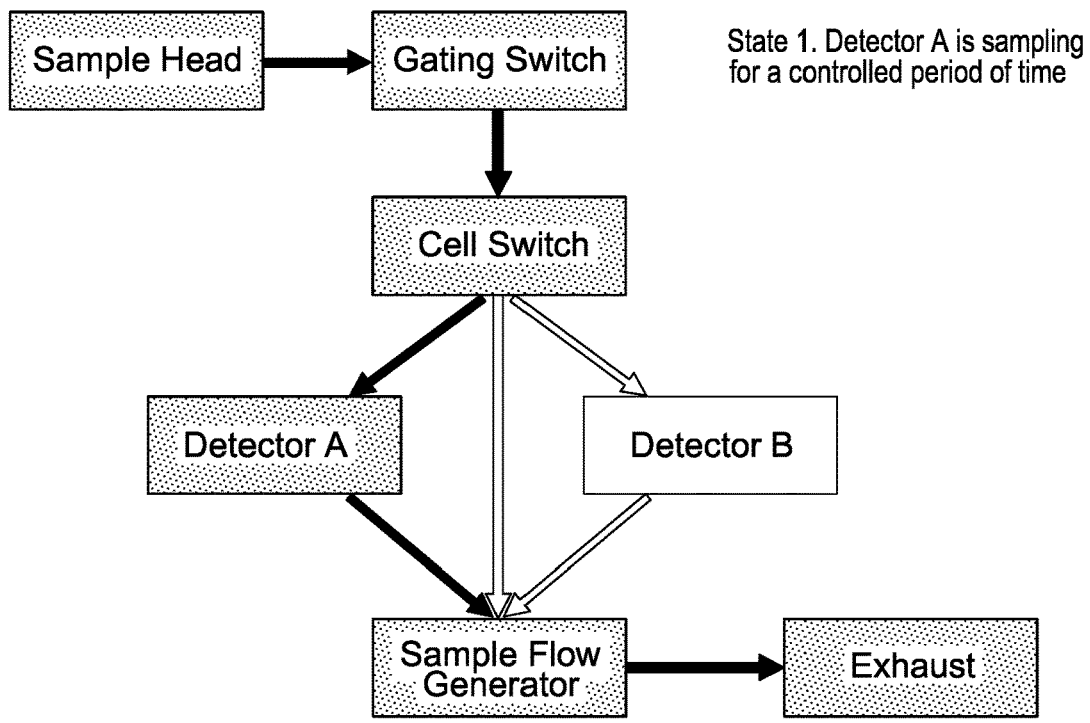
Figure 22:
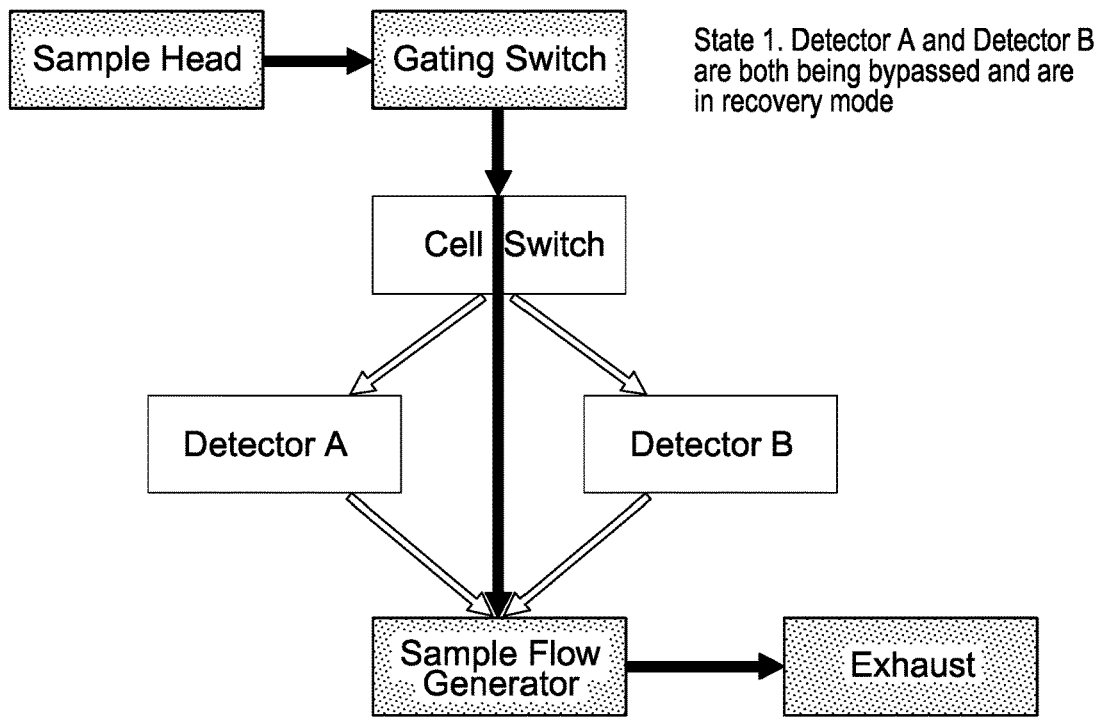
Figure 23:
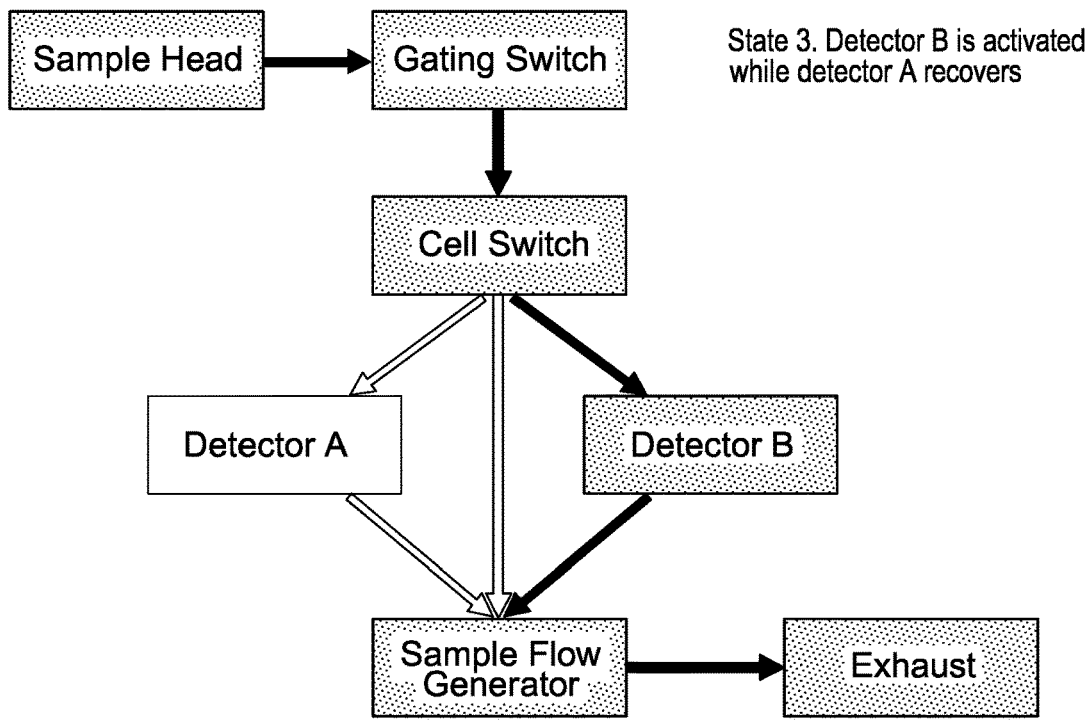

FIGS. 21 to 24 show another multiple detector implementation. This has a gating switch which is connected to a cell switch, which is able to switch detector A and detector B in and out of the sample cell. Associated with the gating switch is a sensor (not shown) for detecting the presence of a can. The gating switch is configured to set a timer in response to a signal from the can detection sensor, the signal being indicative of the presence of a can. The timer defines a wait period. This wait period is a predetermined time that has to lapse before the cell switch is instructed to switch one of the detectors into the sample cell. After the wait period has elapsed, one of the detectors is switched into the cell for a controlled/predetermined time. FIG. 21 shows detector A switched into the sample cell, and detector B bypassed. FIG. 23 shows detector B switched into the sample cell, and detector A bypassed. After the controlled/predetermined time has elapsed, the active detector is switched out of the cell. The wait period and the controlled/predetermined time are selected so that the detector is switched on when the sample concentration is at a maximum. This can be determined experimentally.

Figure 24:
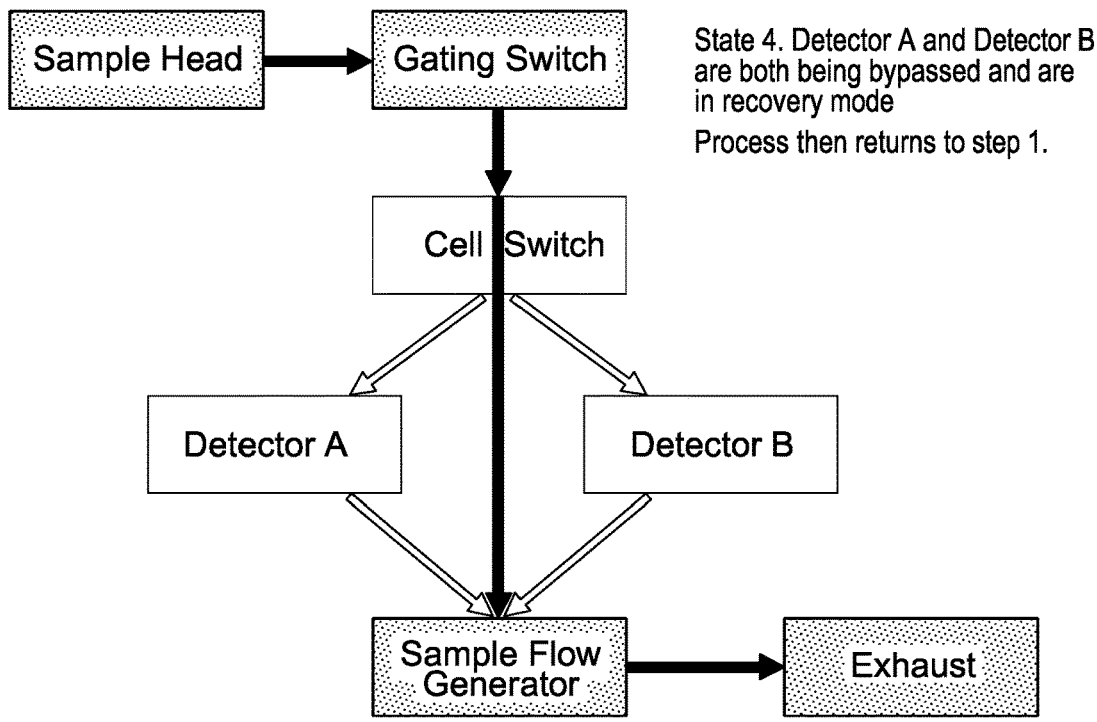

By using a wait period and a controlled/predetermined measurement time, the leak detector is enabled for only a controlled period of time (in contrast in the arrangement of FIGS. 19 and 20 the detector is essentially always enabled, because one or other of the two detectors is always switched into the sample cell). This has the effect of reducing the response time of the sensor by ensuring that it is active only when the sample concentration is at its maximum, allowing additional increases in product test rate. In practice, this means that there are periods in the overall detection process when both of the detectors are bypassed and so inactive. This is shown in FIGS. 22 and 24.

The present invention provides real time continuous leak detection of filled pMDI cans at point of manufacture with a sensitivity of <1 mg/day at a rate greater than 100 cans per minute. Filled pMDI cans are transferred from the production line to the leak detection device and are transferred back to the production line in a continuous manner. A leak check can be done on every canister as part of the production process. This check can be carried out within 10 s of receiving the canister and is sensitive to leaks <1 mg/day. Detection of the leaks in an online environment, so close to filling, allows for almost instantaneous identification of process related issues. Leaking cans are rejected automatically from the production line into a designated area without disruption to production. By carrying out full leak detection online, the need for storage of goods for two to four weeks and the associated re-handling cost of the second weight measurement is eliminated. In addition, production or component issues resulting in a high number of leaking cans are flagged immediately, minimising production losses.

A skilled person will appreciate that variations of the disclosed arrangements are possible without departing from the invention. Accordingly the above description of the specific embodiment is made by way of example only and not for the purposes of limitation. It will be clear to the skilled person that minor modifications may be made without significant changes to the operation described.

What is claimed is:

1. A leak detection system for detecting leaks in pressurised containers, the system comprising:
   a leak test conveyor for moving each container; and
   an accumulation tunnel through which the leak test conveyor extends, wherein the accumulation tunnel and the leak test conveyor together define at least one enclosed accumulation volume, each enclosed accumulation volume being sized to accommodate only a single container, thereby to allow gas leaking from the single container to accumulate, and a gas sensor for sensing accumulated leaked gas from the single container, wherein the at least one enclosed accumulation volume is movable with the leak test conveyor through the accumulation tunnel for a time sufficient to allow leaked gas to accumulate.

2. A leak detection system as claimed in claim 1, wherein the accumulation tunnel and the leak test conveyor define multiple discrete enclosed accumulation volumes.

3. A leak detection system as claimed in claim 1, wherein the leak test conveyor comprises multiple pockets, each pocket defining at least in part the at least one enclosed accumulation volume.

4. A leak detection system as claimed in claim 3, wherein a leading edge of each pocket is tapered.

5. A leak detection system as claimed in claim 1, wherein the leak test conveyor comprises a conveyor belt.

6. A leak detection system as claimed in claim 5, wherein the conveyor belt is vertically oriented.

7. A leak detection system as claimed in claim 1, wherein the leak test conveyor comprises an endless loop.

8. A leak detection system as claimed in claim 1, further comprising a reject mechanism for rejecting leaking containers.

9. A leak detection system as claimed in claim 1, wherein the gas sensor comprises an optical sensor.

10. A leak detection system as claimed in claim 9, wherein the optical sensor includes a laser.

11. A leak detection system as claimed in claim 1, adapted to divert containers from a production line conveyor onto the leak test conveyor.

12. A leak detection system as claimed in claim 11, wherein the leak detection conveyor traverses the production line conveyor.

13. A leak detection system as claimed in claim 12, wherein the leak detection conveyor traverses the production line conveyor substantially perpendicularly.

14. A leak detection system for detecting leaks in pressurised containers, the system comprising:

a leak test conveyor for diverting containers from a production line conveyor into a leak detection test circuit, the leak test conveyor comprising a conveyor that has a plurality of pockets, each pocket sized to receive a single container and a sensor for sensing gas leaked from the containers, wherein the leak test conveyor is arranged to move each container into a substantially enclosed accumulation volume that allows leaked gas to accumulate, wherein the enclosed accumulation volume is defined at least in part by a single pocket, and wherein the enclosed accumulation volume is movable with the leak test conveyor through an accumulation tunnel for a time sufficient to allow leaked gas to accumulate.

15. A leak detection system as claimed in claim 14, wherein the enclosed accumulation volume is defined at least in part by the leak test conveyor.

16. A leak detection system as claimed in claim 14, wherein a leading edge of each pocket is tapered.

17. A leak detection system as claimed in claim 14, further comprising the accumulation tunnel through which the leak test conveyor moves, wherein the accumulation tunnel and the leak test conveyor together define the enclosed accumulation volume.

18. A leak detection system as claimed in claim 14, wherein the leak test conveyor is vertically oriented.

19. A leak detection system as claimed in claim 14, wherein the leak test conveyor comprises an endless loop.

20. A leak detection system as claimed in claim 14, further comprising a reject mechanism for rejecting leaking containers.

21. A leak detection system as claimed in claim 14, wherein the sensor comprises an optical sensor.

22. A leak detection system as claimed in claim 21, wherein the optical sensor includes a laser.

23. A leak detection system as claimed in claim 14, wherein the leak detection conveyor traverses the production line conveyor.

24. A leak detection system as claimed in claim 23, wherein the leak detection conveyor traverses the production line conveyor substantially perpendicularly.

25. A leak detection system as claimed in claim 14, wherein the sensor comprises multiple detectors.

26. A leak detection system as claimed in claim 25, wherein a selector is provided for selectively coupling each detector individually to a respective enclosed accumulation volume.

27. A leak detection system as claimed in claim 25, wherein only one detector is coupled to a respective enclosed accumulation volume at any one time.

28. A conveyor for use in a leak detection system according to claim 1, the conveyor comprising a conveyor belt that has a plurality of pockets, each pocket sized to receive a single container.

29. A conveyor as claimed in claim 28, wherein the conveyor belt is arranged to be vertically oriented in use, and each pocket is sized to receive a single vertically oriented container.

30. A conveyor as claimed in claim 28, that is an endless loop conveyor.

31. A conveyor as claimed in claim 28, wherein the plurality of pockets are attached to the conveyor belt.

* * * * *